US012524415B2

(12) United States Patent
Healey et al.

(10) Patent No.: US 12,524,415 B2
(45) Date of Patent: Jan. 13, 2026

(54) QUERY BASED CLASSIFICATION

(71) Applicant: Adobe Inc., San Jose, CA (US)

(72) Inventors: Jennifer Anne Healey, San Jose, CA (US); Rajiv Bhawanji Jain, Falls Church, VA (US); Joseph D Barrow, Alexandria, VA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/763,635

(22) Filed: Jul. 3, 2024

(65) Prior Publication Data

US 2026/0010535 A1    Jan. 8, 2026

(51) Int. Cl.
    *G06F 16/2457* (2019.01)
    *G06F 16/248* (2019.01)
    *G06N 20/00* (2019.01)

(52) U.S. Cl.
    CPC ...... *G06F 16/24573* (2019.01); *G06F 16/248* (2019.01); *G06N 20/00* (2019.01)

(58) Field of Classification Search
    CPC .. G06F 16/24573; G06F 16/248; G06N 20/00
    See application file for complete search history.

(56) References Cited

U.S. PATENT DOCUMENTS

| | | | | |
|---|---|---|---|---|
| 11,086,645 | B1 * | 8/2021 | Gupta | G06F 9/453 |
| 2002/0147724 | A1 * | 10/2002 | Fries | G06F 16/951 |
| 2016/0180216 | A1 * | 6/2016 | Allen | G06F 40/169 |
| | | | | 706/46 |
| 2018/0314980 | A1 * | 11/2018 | Osotio | G06N 20/00 |
| 2022/0012072 | A1 * | 1/2022 | Barnett | G06F 16/9577 |
| 2024/0296278 | A1 * | 9/2024 | Grimshaw | G06F 40/40 |
| 2024/0354153 | A1 * | 10/2024 | Jonnalagadda | G06F 9/4881 |
| 2024/0354503 | A1 * | 10/2024 | Baruch | G06F 16/345 |
| 2025/0036674 | A1 * | 1/2025 | Hanes | G06F 16/335 |
| 2025/0095222 | A1 * | 3/2025 | Sugden | G06T 11/00 |

OTHER PUBLICATIONS

Amazon, "What is Text Analysis", [retrieved from the internet on Sep. 28, 2024], <https://aws.amazon.com/what-is/text-analysis/>, 2024, 10 pages.

(Continued)

*Primary Examiner* — William P Bartlett
(74) *Attorney, Agent, or Firm* — FIG. 1 Patents

(57) ABSTRACT

Techniques for query based classification are described that support generation of classifications based on user proffered information. In an example, a processing device receives a query for processing by a machine learning model. The processing device then generates a user classification based on the query. The user classification, for instance, indicates one or more user characteristics. The processing device generates a prompt for processing by the machine learning model that includes the query and the user classification. The processing device then presents a result of the processing of the prompt by the machine learning model. For instance, the machine learning model generates a response to the query tailored to the classification. In this way, the techniques described herein support generation of content specific user classifications to perform various functionality.

20 Claims, 12 Drawing Sheets

(56) References Cited

OTHER PUBLICATIONS

Anonymous, "Determining the Ethno-Nationality of Writers Using Written English Text", ICLR 2022 Conference, [retrieved from the internet on Sep. 28, 2024], <https://openreview.net/pdf?id=bq7smM1OJIX>, 2022, 11 pages.

Reimers, Nils, et al., "Sentence-BERT: Sentence Embeddings using Siamese BERT-Networks", Cornell University arXiv, arXiv.org [retrieved Jul. 12, 2023]. Retrieved from the Internet <https://arxiv.org/pdf/1908.10084.pdf>., Aug. 27, 2019, 11 Pages.

Xu, Yu, et al., "Inferring your expertise from Twitter: combining multiple types of user activity", In Proceedings of the International Conference on Web Intelligence (WI '17). Association for Computing Machinery, New York, NY, USA, 2017, pp. 589-598.

Zulkarnian, Nur Zareen, et al., "Writing Style and Word Usage in Detecting Depression in Social Media: a Review", Journal of Theoretical and Applied Information Technology, vol. 98, No. 1, [retrieved from the internet on Sep. 28, 2024], <https://www.jatit.org/volumes/Vol98No1/11Vol98No1.pdf>, Jan. 15, 2020, 12 pages.

\* cited by examiner

QUERY BASED CLASSIFICATION

BACKGROUND

User behavior is often modelled for various applications, such as to generate personalized recommendations, deliver targeted advertising, and/or optimize a user experience. Accordingly, a variety of techniques have been developed to model user preferences, interests, and behaviors in a digital environment. For instance, conventional techniques collect user demographic data (e.g., gender, location, etc.) to categorize users. However, such techniques often rely on expenditure of significant computational resources to collect and analyze such data. Accordingly, such demographic data is often unavailable or objectionable due to user privacy concerns. Further, such techniques lack specificity to accurately inform decisions on a content specific level, which limits the utility of these techniques.

SUMMARY

Techniques for query based classification are described that support generation of classifications based on user proffered information. In an example, a processing device receives a query that pertains to a topic for processing by a machine learning model, such as a query to an artificial intelligence ("AI") based digital assistant within an application user interface. Based on semantic properties of the query, the processing device determines a classification that indicates one or more user characteristics, such as a degree of proficiency with respect to the topic of the query.

The processing device is configured to perform a variety of functionality using the classification. For instance, the processing device generates a prompt for processing by the machine learning model based on the classification and the query. The machine learning model generates a result of the processing, such as to generate a response to the query tailored to the classification. The processing device is further operable to change a condition of a user interface of the processing device based on the classification and/or to generate supplemental digital content for display based on the classification. In this way, the techniques described herein support classification based functionality at a topic specific level while protecting user privacy and conserving computational resources relative to conventional techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRA WINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
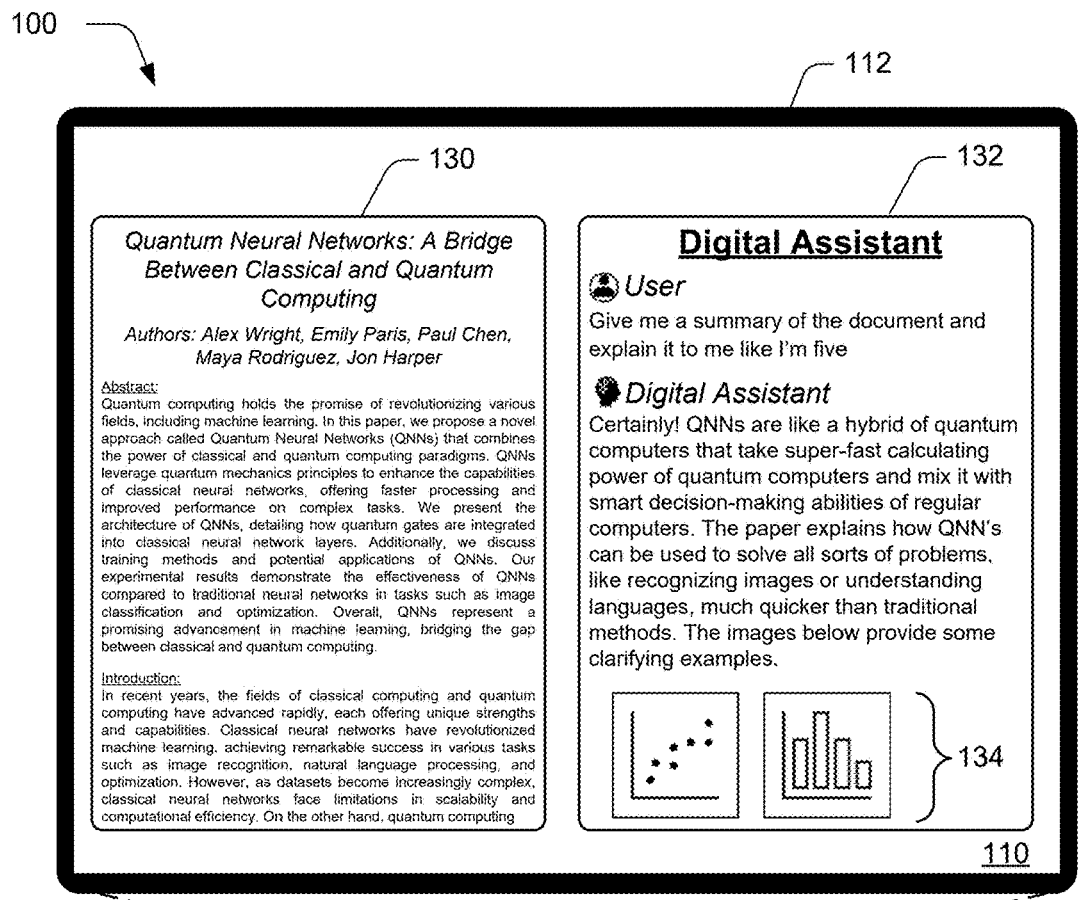
FIG. 1 is an illustration of a digital medium environment in an example implementation that is operable to employ the query based classification techniques described herein.
Figure 1:
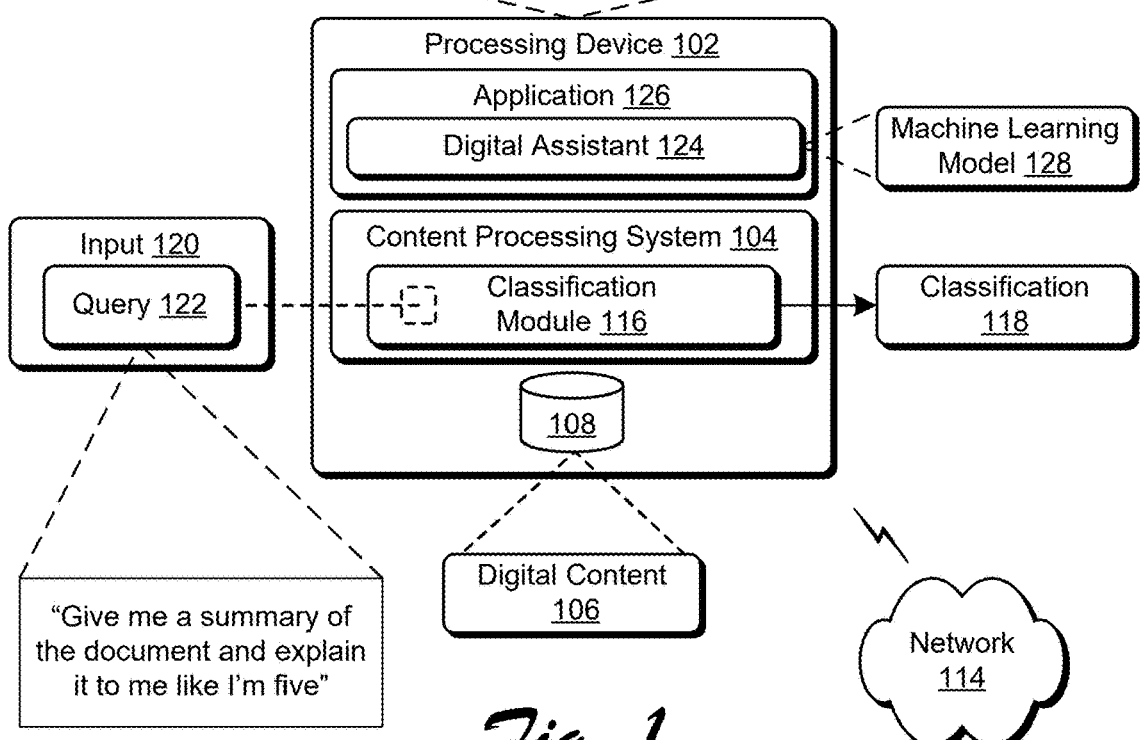

Content processing systems often collect and analyze user behavior to perform a variety of functionality, such as to generate personalized content or deliver targeted recommendations. For example, conventional techniques collect and analyze a variety of user demographic data to categorize users, such as by age, gender, location, etc. However, these techniques expend significant computational resources to collect and analyze such data. For instance, conventional techniques rely on large amounts of user data to generate limited insights. Further, collection of user data in this way often raises privacy concerns and is unavailable in a variety of scenarios. Additionally, categorizations generated using conventional techniques are generalized and fail to capture nuances of individual behavior and/or experience with respect to particular domains, topics, and/or instances of digital content.

Accordingly, techniques and systems for query based classification are described that overcome these limitations and generate classifications based on user proffered information. For instance, the techniques described herein generate a classification of a user associated with a query based on semantic properties of the query, e.g., "how" a query is asked. In this way, the techniques described herein are able to efficiently generate insights that are not obtainable using conventional approaches.

Consider an example in which a processing device displays an application user interface that includes an artificial intelligence ("AI") digital assistant. The application, for instance, is a document viewing application configured to display a digital document for interaction by a user. This is by way of example and not limitation, and a variety of applications are considered as further described below.

The digital assistant represents a software component that is designed to receive input such as natural language requests and/or commands and provide assistance and/or perform tasks based on the input. The digital assistant, for instance, is an artificial intelligence based program designed to understand and respond to user queries within the application user interface. In various examples, the digital assistant leverages a machine learning model, such as a large language model ("LLM"), to respond to user queries.

The processing device receives an input that includes a query. The query represents a question and/or command provided to the digital assistant. For instance, the query is a natural language request for information, task execution, search functionality, personalization, etc. to be performed by the machine learning model. Continuing with the above example, the query includes a request to summarize a document displayed by the document viewing application. For instance, the query includes the text string "can you provide a simple summary of this document?"

Based on semantic properties of the query, the processing device generates a classification that indicates one or more characteristics of a user associated with the query. In one or more examples, the classification indicates a degree of proficiency with a topic of the query. For instance, the degree of proficiency is below a threshold and the classification indicates that the user is a "novice" with respect to the topic. Alternatively, the degree of proficiency is above the threshold and the classification indicates that the user is an "expert" with respect to the topic. This is by way of example and not limitation, and in various embodiments the classification indicates one or more characteristics such as a profession, a role, an industry, etc.

To generate the classification, the processing device generates an embedding of the query as a feature vector using an embedding model. The processing device then inputs the embedding into a classifier model configured for a classification task. The classifier, for instance, is configured to generate a classification based on semantic properties of the query such as a language style of the query, presence of keywords or text strings in the query, sentiment analysis information, task classification information, etc. A variety of classifiers are considered such as one or more of a support vector machine ("SVM"), supervised learning algorithm, Naive Bayes classifier, decision tree, clustering algorithm, artificial neural network, LLM, etc.

In some examples, the classification is further based on one or more aspects of a user interaction within the application user interface, e.g., a behavioral metric such as a reading speed, a time per page metric, a scrolling metric, etc. Additionally or alternatively, the classification is further based on properties of digital content included in the application user interface, such as the digital document. For example, the processing device generates the classification based in part on metadata (e.g., a file size, page count, file format, document structure, etc.) associated with the digital document.

Accordingly, the processing device generates the classification based on one or more of a semantic context of the query, a behavioral metric associated with a user interaction within the application user interface, and/or on metadata associated with digital content displayed by the application user interface. Continuing with the above example, the processing device generates the classification which indicates a degree of proficiency of the user with a topic of the query is less than a threshold value and thus that the user is a "novice" with respect to the topic.

The processing device is configured to utilize the classification to perform a variety of functionality. In one example, the processing device generates a prompt for the machine learning model associated with the digital assistant based on the query. The prompt, for instance, is a structured input based on the query to guide the machine learning model. In an example, the processing device generates one or more input specifications to tune the prompt based on the semantic properties of the query. The input specifications, for instance, guide and/or constrain the prompt to influence the machine learning model during generation of an output.

Based on the prompt, the machine learning model generates a result such as a response to the query that is tailored to the classification. Continuing with the above example, the processing device generates a summary of the digital document based on the classification of the user as a novice. For instance, the processing device generates the summary to include simple language, discusses basic concepts, and provide a general overview of the digital document without inclusion of complex technical details.

In various embodiments, the processing device is further operable to modify one or more conditions of the application user interface based on the classification. For instance, the processing device surfaces (e.g., adds) and/or removes one or more digital tools, icons, menus, selectable indicia, feedback elements, etc. from the application user interface based on the classification. Alternatively or additionally, the processing device changes one or more display settings of the processing device based on the classification.

Continuing with the above example, based on the classification that indicates the degree of proficiency of the user with a topic of the query is less than the threshold value (e.g., that the user is a novice) the processing device surfaces a navigation tool to assist the user in navigation of the digital document. The processing device further removes one or more additional tools from the application user interface, such as an advanced annotation tool and an advanced indexing tool, which are unlikely to be used by a novice user.

In additional or alternative examples, the processing device generates supplemental content for display in the application user interface based on the classification. The supplemental content, for instance, includes a variety of digital content (e.g., digital images, digital videos, text, audio content, instructional content, etc.) generated based on the classification. In some examples, the processing device includes a generative model that is configured to generate the supplemental content.

Continuing with the above example in which the classification indicates the user is a novice with respect to the topic, the processing device generates supplemental content to explain the topic of the query in accordance with the classification. For instance, the processing device generates and outputs one or more instances of visual media, such as a graph and an explanatory visual, to convey concepts associated with the topic. The processing device further outputs supplemental content that includes a selectable navigational menu to assist the user in navigating the digital document.

In this way, the techniques described herein generate content specific classifications based on user proffered information which is leveraged for a variety of functionality to improve a user experience. This overcome the limitations of conventional user modeling techniques that are reliant on computationally heavy user data collection, and further lack capability to provide granular insights, such as insights based on topics particular to various digital documents.

Further discussion of these and other examples and advantages are included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the query based classification techniques described herein. The illustrated environment 100 includes a processing device 102, which is configurable in a variety of ways.

The processing device 102, for instance, is configurable as a computing device such as a desktop computer, a laptop computer, a mobile device (e.g., assuming a handheld configuration such as a tablet or mobile phone), and so forth. Thus, the processing device 102 ranges from full resource devices with substantial memory and processor resources (e.g., personal computers, game consoles) to a low-resource device with limited memory and/or processing resources (e.g., mobile devices). Additionally, although a single processing device 102 is shown, the processing device 102 is also representative of a plurality of different devices, such as multiple servers utilized by a business to perform operations "over the cloud" as described in FIG. 12.

The processing device 102 is illustrated as including a content processing system 104. The content processing system 104 is implemented at least partially in hardware of the processing device 102 to process digital content 106, which is illustrated as maintained in storage 108 of the processing device 102. Such processing includes receipt of the digital content 106, creation of the digital content 106, modification of the digital content 106, analysis of the digital content 106, and rendering of the digital content 106 in a user interface 110 for output, e.g., by a display device 112. Although illustrated as implemented locally at the processing device 102, functionality of the content processing system 104 is also configurable in whole or in part via functionality available via a network 114, such as part of a web service or "in the cloud."

An example of functionality incorporated by the content processing system 104 to process the digital content 106 is illustrated as a classification module 116. The classification module 116 is configured to generate a classification 118, such as a user classification, based on various inputs to a large language model. In the illustrated example, for instance, the classification module 116 receives an input 120 that includes a query 122 to a digital assistant 124 of an application 126.

The application 126, for instance, includes functionality for performing various computing tasks via the processing device 102 and is representative of one or more document viewing applications, digital content creating and/or editing applications, gaming applications, media consumption (e.g., content streaming) applications, productivity task (e.g., word processing, content generation, data analysis, etc.) applications, web browsing applications, communication applications, and so forth. In the example, the digital assistant 124 is a software component designed to receive input such as requests and/or commands and provide assistance and/or perform tasks based on the input. The digital assistant 124, for instance, is an artificial intelligence based program designed to understand and respond to user queries and/or commands, such as within an application user interface of the application 126. In various examples, the digital assistant 124 leverages one or more machine learning models 128, such as a large language model ("LLM"), and/or one or more natural language processing techniques.

A variety of machine learning models 128 are considered. In various examples, the machine learning model 128 uses one or more of deep learning, supervised learning, semi-supervised learning, unsupervised learning, and/or reinforcement learning. For example, the machine learning model can include, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc.

The query 122 represents a question and/or command provided to the digital assistant 124. The query 122, for instance, is a natural language request for information, task execution, search functionality, personalization, etc. to be performed by the machine learning model 128. In the illustrated example, the query 122 includes a request to summarize a digital document 130 that is displayed by a document viewing application in the user interface 110. For instance, the query 122 includes the text string "give me a summary of the document and explain it to me like I'm five." Based on a semantic context of the query 122, the classification module 116 generates the classification 118.

As further described below, in various examples the classification 118 indicates one or more user characteristics based on the query 122. In one or more examples, the classification 118 indicates a degree of proficiency with a particular topic, such as a topic of the query 122. In the illustrated example, the classification 118 indicates a degree of proficiency with the digital document 130, for instance, whether a user associated with the query 122 is an expert or a novice with respect to a topic of the digital document 130, e.g., quantum neural networks. Based on a semantic context of the query 122 and in accordance with the techniques described in further detail below, the classification module 116 determines that a user associated with the query 122 is a novice with respect to the topic of the query 122, e.g., quantum neural networks.

The classification module 116 is configurable to perform a variety of functionality based on the classification 118, such as to tune a prompt to the machine learning model 128 (e.g., an LLM) of the digital assistant 124, to generate a variety of digital content 106 such as for display in the user interface 110, to change a condition of the user interface 110, etc. In the illustrated example, the classification module 116 adjusts a prompt to the digital assistant 124 based on the classification 118, such as to generate a response 132 that includes a summary tailored for a novice in quantum neural networks.

The classification module 116 further generates supplemental content 134, e.g., one or more instances of digital content 106, based on the classification 118 of the user as a novice. In the illustrated example, the classification module 116 generates supplemental content 134 that includes several images to further explain the content of the digital document 130, e.g., two graphs. In this way, the techniques described herein provide a personalized experience based on content of input queries 122, which protects user privacy while enhancing a user experience. These techniques further optimize resource management and reduce computational overhead through avoidance of repeated queries to the digital assistant 124. Further discussion of these and other advantages is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Query Based Classification

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm. In portions of the following discussion, reference will be made to FIGS. 1-11.

Figure 2:
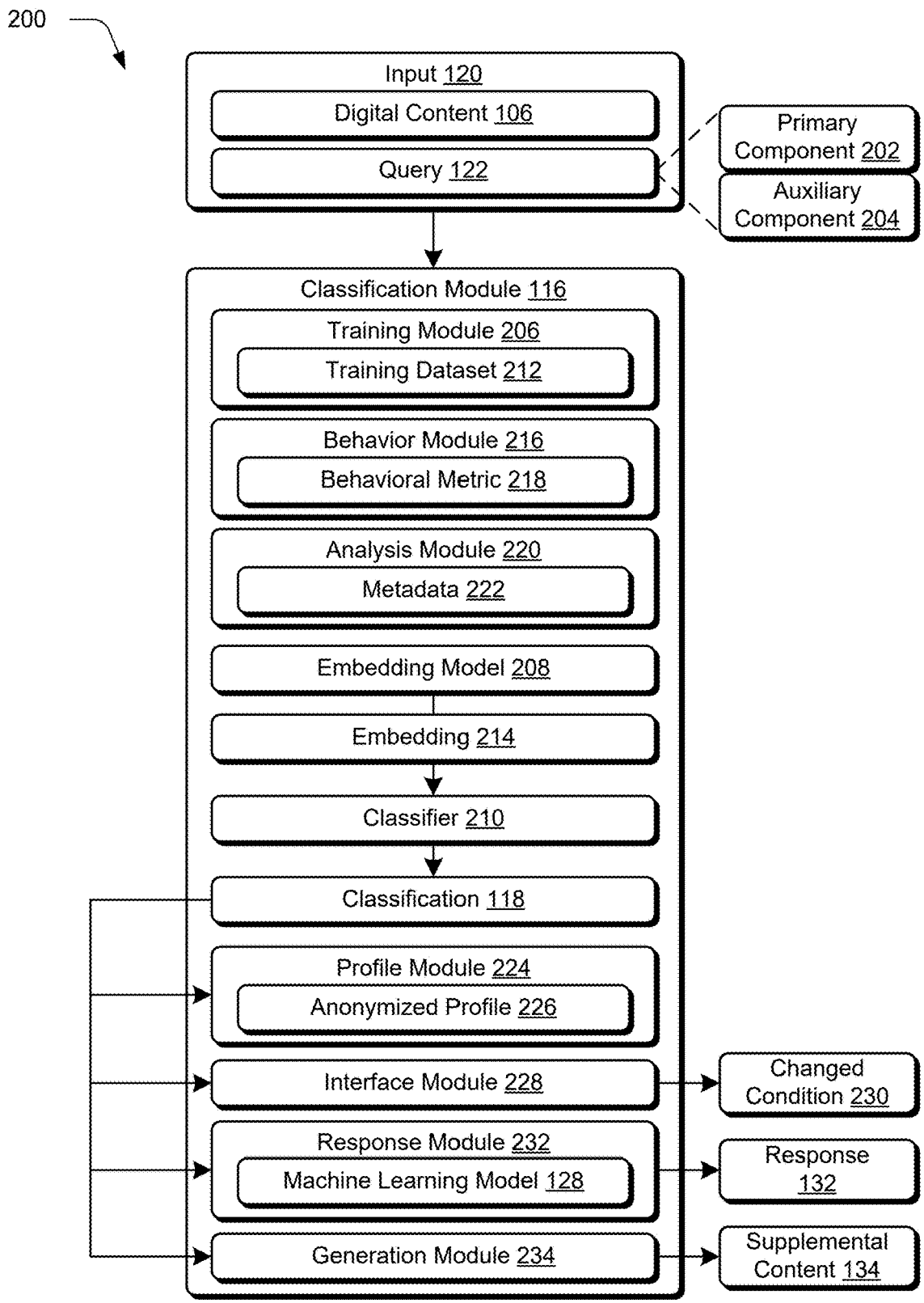
FIG. 2 depicts a system in an example implementation showing operation of a classification module in greater detail.

FIG. 2 depicts a system 200 in an example implementation showing operation of a classification module 116 of FIG. 1 in greater detail. Generally, the classification module 116 is operable to generate a classification 118 based on a semantic context of a query 122. As described in more detail below, the classification module 116 is operable to leverage the classification 118 to perform a variety of functionality.

In an example, the classification module 116 receives an input 120 that includes the query 122. As described above, the query 122 represents a question and/or command, such as a question and/or a command provided to a digital assistant 124 of an application 126. The query 122, for instance, is a natural language request for information, task execution, search functionality, personalization, etc.

The query 122 includes a primary component 202 as well as an auxiliary component 204. The primary component 202 represents a main directive and/or purpose of the query 122. For instance, the primary component 202 defines a request for the digital assistant 124, such as a request to be performed by a machine learning model 128 associated with the digital assistant 124. The auxiliary component 204 includes auxiliary information that defines a semantic context (e.g., one or more semantic properties) for the query 122. The auxiliary component 204, for instance, provides additional information to clarify, refine, constrain, and/or supplement the primary component 202.

By way of example, a query 122 that includes the text "give me a summary of the article highlighting key findings." The primary component 202 in this example is "give me a summary" while the auxiliary component 204 includes the string "of the article highlighting key features." That is, the auxiliary component 204 provides additional detail to contextualize the primary component 202, e.g., what the summary is about and a requirement for the digital assistant 124 that the summary highlight key features.

The query 122 further pertains to one or more topics. Generally, the topic pertains to a subject, field, and/or category of the query 122. In one example, the query 122 pertains to one or more aspects of an application 126, such as how to perform various functionalities using the application 126. In an additional or alternative example, the topic relates to an instance of digital content 106, such as a topic of a digital document 130.

For example, the classification module 116 further receives digital content 106 as part of the input 120. In various implementations, the digital content 106 is received as part of execution of an application 126. In an example, the application 126 is a document viewing application and the digital content 106 includes a digital document 130. In an additional or alternative example, the application 126 is a photo editing application and the digital content 106 includes an instance of visual media, e.g., a digital image. In various examples, the digital content 106 is representative of an aspect of an application user interface of the application 126, such as one or more digital tools, icons, menus, buttons, selectable indicia, feedback elements, etc. This is by way of example and not limitation, and a variety of types of applications 126 and digital content 106 are considered.

Based on the query 122, the classification module 116 generates a classification 118 that indicates one or more characteristics, such as characteristics of a user associated with the query 122. The characteristics, for instance, categorize one or more users into discrete groups based on semantic properties of the query 122. In some examples, the characteristics indicate one or more of a proficiency level with a particular topic (e.g., novice, intermediate, expert, etc.), a profession (e.g., marketing, research, engineering, finance, etc.), a role (e.g., customer, employee, developer, administrator, supervisor, etc.), an industry (e.g., healthcare, legal, education, technology, etc.), an age group, an education level, user motivations, etc.

For example, the classification 118 indicates a degree of proficiency with the topic of the query 122. The classification 118, for instance, is a binary classification that indicates whether a user associated with the query 122 is proficient with the topic. In an example, the classification module 116 determines that the degree of proficiency is below a threshold and accordingly generates the classification to indicate that the user is not proficient with respect to the topic, e.g., the user is classified as a "novice." Alternatively or additionally, the classification module 116 determines that the degree of proficiency is above a threshold and accordingly generates the classification to indicate that the user is proficient with respect to the topic, e.g., the user is classified as an "expert."

In various examples, the classification 118 is a multivariate classification (e.g., not limited to a binary classification) such that the classification 118 can include two or more categories based on a degree of proficiency. In some implementations, the classification 118 is based on a continuous metric of proficiency, e.g., from zero to one. By generating such classifications 118 based on semantic properties of the query 122 (e.g., rather than using conventional data mining/collection techniques) the techniques described herein protect user privacy while generating user classifications 118 that support a variety of functionality. Further, the classifications 118 are topic specific, such that in an example a user is classified as an "expert" in a first topic while classified as a "novice" with respect to a second topic.

To generate the classification 118, in one or more examples the classification module 116 implements a training module 206 to train and/or configure an embedding model 208 and/or a classifier model, e.g., a classifier 210, to generate classifications based on semantic properties and/or features of queries. A variety of classifiers 210 are considered such as one or more of a support vector machine ("SVM"), supervised learning algorithm, Naive Bayes classifier, decision tree, clustering algorithm, artificial neural network, LLM, etc.

In an example to train the classifier 210, the training module 206 leverages a training dataset 212 that includes training queries and corresponding training classifications to train the classifier 210. The training queries represent requests for the digital assistant 124 to perform a task, such as to summarize a document. The training queries, for instance, vary semantically one to another. For example, the training queries represent different ways to "ask" the digital assistant 124 to summarize the document.

The training queries are each associated with a training classification, e.g., a "ground truth" user characteristic. For instance, a training classification represents whether a training query corresponds to an "expert" user characteristic or a "novice" user characteristic. In another example, a training classification represents whether a training query corresponds to a particular profession, e.g., marketing, research, engineering, finance, etc.

To train the classifier 210, the training module 206 utilizes the embedding model 208 to generate embeddings 214 as feature vectors of the training queries. In an example, the embedding model 208 is a sentence embedding model such as a sentenceBERT encoder such as described by Reimers et al., *Sentence-BERT: Sentence Embeddings using Siamese BERT-Networks*. arXiv preprint arXiv: 1908.10084 (2019). Based on the embeddings 214 of the training queries, the training module 206 generates classification predictions using the classifier 210 and adjusts one or more parameters of the classifier 210 by comparing the classification predictions to the training classifications.

Once trained, the classification module 116 is operable to leverage the embedding model 208 and the classifier 210 to generate a classification 118. For instance, the embedding model 208 generates an embedding 214 of the query 122 as a feature vector for input to the trained classifier 210. In some examples, the classification module 116 extracts the auxiliary component 204 from the query 122. The embedding model 208 then generates the embedding 214 based on the auxiliary component 204 using the classifier 210. Alternatively or additionally, the embedding model 208 generates the embedding 214 based on the primary component 202 and the auxiliary component 204.

The classifier 210 is operable to receive the embedding 214, e.g., a feature vector, and generate the classification 118 based on a semantic context of the query 122. The semantic context, for instance, includes an overall meaning, intent, and/or interpretation of the query 122. In an example, the semantic context includes information associated with the query 122 in addition to a literal meaning of the query 122, and is based on one or more factors such as domain information, user intent, topic information, contextual information, etc.

In various examples, the semantic context is based on the auxiliary component 204 of the query 122. For instance, the classification module 116 extracts the auxiliary component 204 from the query 122 and leverages the classifier 210 to generate the classification 118 based on the auxiliary component 204. The auxiliary component 204, for instance, includes semantic properties such as one or more of a language style/complexity of the query 122, a specificity of the query 122, presence of keywords or text strings in the query 122, query length and/or detail, sentiment analysis information, grammar, and/or task classification information. The auxiliary component 204 can further include information from multiple queries 122, such as a query history as described in more detail below.

Consider an example in which the classifier 210 is trained to determine a user proficiency with a topic of the query 122. The classifier 210 determines that a user proficiency is below a threshold value, e.g., a user is not proficient in the topic, based on one or more of a simplicity of language used in the query 122, a query history that indicates repeated inquiries about the topic, a short length of the query 122, keywords or phrases detected in the query 122, and/or a type of request included in the query 122.

Alternatively or additionally, the classifier 210 determines that a user proficiency is above a threshold value, e.g., a user is proficient in the topic, based on one or more of a complexity of language used in the query 122, lack of a query history about the topic, a level of detail included in the query 122, key phrases detected in the query 122 such as domain specific keywords, and/or a type of request included in the query 122. This is by way of example and not limitation, and a variety of semantic context information and classifications 118 are considered.

In various examples, the classification module 116 generates the classification 118 based in whole or in part on one or more aspects of an interaction to generate the query 122. For instance, the classification module 116 includes a behavior module 216 that is operable to generate a behavioral metric 218. The behavioral metric 218 is a quantifiable measure that represents one or more aspects of an interaction, e.g., a user interaction, to generate the query 122. In various examples, the behavioral metric 218 includes a number of queries generated as part of the interaction, a frequency of queries generated as part of the interaction, and or a similarity between multiple queries 122 included as part of the interaction. For instance, the classification module 116 can determine a similarity metric between two or more queries 122, such as to detect whether multiple queries 122 have been received that pertain to a same or similar topic.

In some examples, the behavior module 216 generates the behavioral metric 218 based on an interaction, e.g., a user interaction, with the digital content 106. Consider an example in which the digital content 106 includes a digital document 130. The behavior module 216 is configured to detect one or more of a reading speed, a time per page metric, a scrolling behavior, an interaction with multimedia content within the digital document 130, etc. to generate the behavioral metric 218.

In one example, a read time over a threshold indicates that a user associated with the query is below a threshold level of proficiency with the topic, e.g., the user is a novice, while a read time under a threshold indicates that a user associated with the query is above a threshold level of proficiency with the topic, e.g., the user is an expert who "skims" the document.

In an additional or alternative example, the behavior module 216 generates the behavioral metric 218 based on a detection that the user frequently views multimedia content associated with the digital document 130, which is indicative that the user lacks proficiency with a topic of the digital document 130. Thus, the classification module 116 is operable to generate the classification 118 based in whole or in part on the behavioral metric 218.

In various embodiments, the classification module 116 generates the classification 118 based in whole or in part on one or more aspects of the digital content 106. For instance, the classification module 116 includes an analysis module 220 that extracts and/or generates metadata 222 associated with the digital content 106. In some embodiments, the analysis module 220 implements a privacy procedure to conceal content information of the digital content 106 (e.g., title, authors, text and/or media within the digital content 106, etc.) such that the metadata 222 is administrative and/or descriptive metadata that includes information about a structure and/or various attributes of the digital content 106.

For instance, the analysis module 220 generates metadata 222 such as a page count, a file size, a file format, a document structure, a file source, etc. In some examples, the analysis module 220 determines a relationship between two or more instances of metadata 222. For example, the analysis module 220 analyzes a relationship between a page count and a file size of a document. A high file size to page count ratio, for instance, is indicative of a relatively high concentration of multimedia content, such as digital images and/or digital videos, whereas a relatively low file size to multimedia content ratio indicates a relatively low number of multimedia elements in the document. This is informative during generation of the classification 118. In one example, a high concentration of multimedia content indicates a relatively "simple" document, and thus a user associated with the query 122 is likely not proficient with a topic of the document.

In an additional or alternative example, the analysis module 220 generates the metadata 222 based on a file postage stamp associated with the digital content 106. The file postage stamp, for instance, includes information about properties and/or attributes of the digital content 106 such as a file name, type, size, format, date modified, anonymized visitor ID, etc. In some examples, the file postage stamp includes a preview of the digital content 106 that depicts a structure of the digital content 106 without revealing content of the digital content 106.

The analysis module 220 can identify the structure of the digital content 106 based on the preview. In an example, the analysis module 220 identifies a type of digital content 106 based on the structure. For instance, the analysis module 220 determines the structure of a digital document 130 includes two columns with an abstract paragraph, and thus is likely a technical research paper.

Accordingly, the classification module 116 can generate a variety of classifications 118, e.g., user classifications, based on insights derived from semantic properties of a query 122, user provided behavioral traits, and/or information derived from metadata 222 in the absence of conventional sources of user data. In this way, the techniques described herein conserve computational resources relative to conventional techniques that rely on computationally expensive data collection and analysis to model user behavior. Further, the techniques described herein protect user privacy during generation of content specific insights, which is not possible using conventional techniques.

The classifications 118 generated by the classification module 116 are usable in a variety of ways. In one or more examples, the classification module 116 includes a profile module 224 that is operable to associate the classification 118 with an anonymized profile 226. For example, an anonymized profile 226 associated with a particular user indicates that the user is an expert with respect to a first topic but is a novice with respect to a second topic. Accordingly, the classification 118 is able to inform subsequent responses to additional queries. Thus, the classification module 116 is operable to perform a variety of functionality, e.g., the functionality described below, based on a query history associated with the anonymized profile 226.

In some examples, the classification module 116 includes an interface module 228 that generates and/or implements a changed condition 230 to the user interface 110 based on the classification 118. For instance, the interface module 228 is configured to modify one or more aspects of the user interface 110, such as a visual appearance of the user interface 110, content displayed by the user interface 110, personalized features of the user interface 110, etc.

In some examples, the changed condition 230 includes one or more changed device properties, such as one or more display settings of the display device 112 that displays the user interface 110, e.g., brightness, saturation, contrast, color profile, etc. For example, the classification 118 indicates that a user associated with the query 122 has a particular profession, e.g., a writer. Accordingly, the interface module 228 generates the changed condition 230, such as to implement a "dark mode" of the display device 112 to reduce eye strain for the user.

In various examples, the changed condition 230 includes surfacing and/or removing one or more tools, icons, menus, selectable indicia, feedback elements, etc. from the user interface 110 of an application 126. For instance, the classification 118 indicates that a user associated with the query 122 is a novice with respect to a topic of the query 122. Accordingly, the interface module 228 is operable to remove one or more tools from the application user interface 110 such as to present a simplified view for the user. The interface module 228 is further operable to implement an instructional version of the application 126 in the user interface 110 such as to instruct the user how to navigate and/or use the application 126.

In an additional or alternative example, the classification 118 indicates that a user associated with the query 122 is an expert with respect to a topic of the query 122. Accordingly, the interface module 228 generates the changed condition 230 to surface one or more tools within the application user interface 110. The interface module 228 is further operable to display an advanced setting of the application 126 in the user interface 110, such as one or more tools that provide increased control, customization, and/or efficiency to the user classified as an expert.

The classification module 116 further includes a response module 232 that is operable to generate a response 132 to the query 122 based on the classification 118. The response 132, for instance, includes relevant information, suggestions, and/or actions based on the query 122. In one or more embodiments, the response module 232 leverages a machine learning model 128 to generate the response 132. As described in more detail above, a variety of machine learning models 128 are considered. In one more examples, the machine learning model 128 includes a large language model ("LLM") configurable to comprehend, analyze, and/or generate human-like text.

To generate the response 132, the response module 232 generates a prompt for the machine learning model 128 based on the query 122 and the classification 118. The prompt, for instance, is a structured input provided to guide the machine learning model 128. Accordingly, the response module 232 is operable to translate the query 122 into a prompt that serves as an input to the machine learning model 128.

In an example to generate the prompt, the response module 232 analyzes the primary component 202 and/or the auxiliary component 204 of the query 122 to comprehend the query 122. Based on the primary component 202 and the auxiliary component 204, the response module 232 generates the prompt to specify a task for the machine learning model 128 to perform as well as a context to guide the machine learning model 128 during execution of the task.

In some examples, the response module 232 is configured to perform prompt tuning/engineering to adjust the prompt based on the classification 118. In an example, the response module 232 generates one or more input specifications to influence the machine learning model 128 as part of tuning the prompt. The input specifications, for instance, guide and/or constrain the prompt to influence the generated output by the machine learning model 128.

In various examples, the input specifications are based in part or in whole on the query 122, the classification 118, the digital content 106, and/or the anonymized profile 226. Once generated, the machine learning model 128 receives the tuned prompt and generates the response 132 based on the prompt. The classification module 116 is further operable to output the response 132, such as in the user interface 110.

In an example, the classification 118 indicates that a user proficiency with a topic of the query 122 is below a threshold value. Accordingly, the response module 232 generates an input specification to tune a prompt to generate the response 132 for a novice with respect to the topic. In another example, the classification 118 indicates that a user proficiency with a topic of the query 122 is above a threshold value. Accordingly, the response module 232 generates an input specification to tune a prompt to generate the response 132 for an expert with respect to the topic. This is by way of example and not limitation, and the response module 232 is operable to generate a variety of input specifications to tune the prompt based on the query 122 and/or the classification 118.

In one or more examples, the classification module 116 further includes a generation module 234 that is operable to generate supplemental content 134. The supplemental content 134, for instance, includes one or more instances of digital content based on the classification 118. In some examples, the supplemental content 134 is generated for output along with the changed condition 230 and/or the response 132. For instance, the supplemental content 134 is generated to explain the changed condition 230 and/or the response 132. The supplemental content 134, for instance, includes one or more of a summary of the digital content 106, an outline of the digital content 106, selectable indicia indicating topics and/or questions addressed in the digital content 106, explanatory content associated with the changed condition 230, etc.

In an example, the classification 118 indicates that a user associated with the query 122 is a novice. Accordingly, the supplemental content 134 includes one or more instances of digital content, such as visual media including one or more digital images or digital videos, which explains a topic of the query. In another example, the classification 118 indicates that a user associated with the query 122 is an expert, and the generation module 234 generates supplemental content 134 that expounds on a topic of the query, such as alternative recommended digital content, advanced tutorials, interactive data visualizations, etc.

The generation module 234 is configured to generate the supplemental content 134 in a variety of ways. In an example in which the input 120 includes digital content 106, the generation module 234 extracts the supplemental content 134 from the digital content 106 for output. In at least one example, the generation module 234 leverages one or more machine learning models, such as a generative model, to generate the supplemental content 134 based on the query 122 and the classification 118. Accordingly, the techniques described herein leverage the classification 118 for a variety of functionality, some examples of which are described below.

Figure 3:
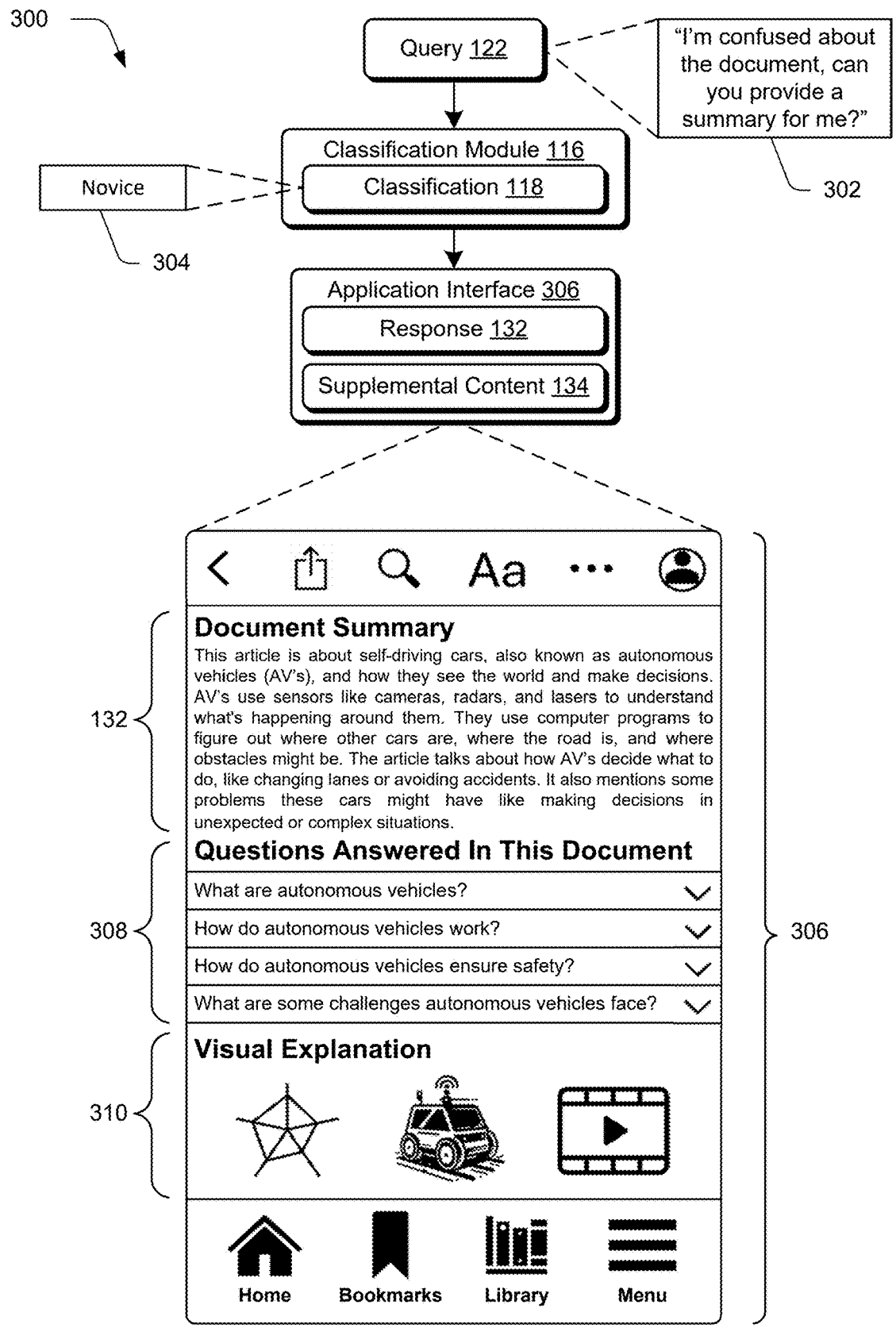
FIG. 3 depicts an example of query based classification in which an output is generated based on a query.

FIG. 3 depicts an example 300 of query based classification in which an output is generated based on a query. In this example, the classification module 116 receives an input 120 that includes a query 122 to a digital assistant 124 of an application 126. The application 126 represents a document viewing application such as to display and interact with a digital document 130. In this example, the digital document 130 is a technical paper that pertains to autonomous vehicles. The query 122 includes a request to summary the digital document 130, e.g., the query 122 includes text 302 "I'm confused about the document, can you provide a summary for me?"

Based on the query 122, the classification module 116 generates a classification 118 of a user associated with the query 122. For instance, the classification module 116 leverages an embedding model 208 to generate an embedding 214 of the query 122 for input to a classifier 210, such as a support vector machine. The classifier 210 then generates the classification 118 based on semantic properties of the query 122. In this example the classification 118 indicates that the user associated with the query 122 has a proficiency level with the document, e.g., autonomous vehicles, below a threshold level. Accordingly, the classifier 210 classifies the user as a "novice" as shown at 304.

Based on the classification 118, the classification module 116 configures an application interface 306. The application interface 306, for instance, includes a response 132 to the query 122 as well as several instances of supplemental content 134. To generate the response 132, the classification module 116 generates a prompt for a machine learning model 128 associated with the digital assistant 124 based on the classification 118 and the query 122. For instance, the prompt specifies to generate a summary and to tailor the summary for a novice in autonomous vehicles. Thus, the prompt includes the query 122 as well as the classification 118.

Accordingly, the classification module 116 generates the response 132 to include simple language, discuss basic concepts, and provide a general overview of the digital document 130 without inclusion of complex technical details. The classification module 116 further generates supplemental content 134, such as a questions answered section 308 and a visual explanation 310. The section 308, for instance, includes selectable indicia to explain concepts included in the digital document 130. The visual explanation 310 includes several instances of a digital content to explain the topic of the query 122, e.g., autonomous vehicles, in an approachable, clear, and concise manner. In this way, the techniques described herein provide a modality to generate a content specific tailored user experience based on user proffered information while protecting user privacy.

Figure 4:
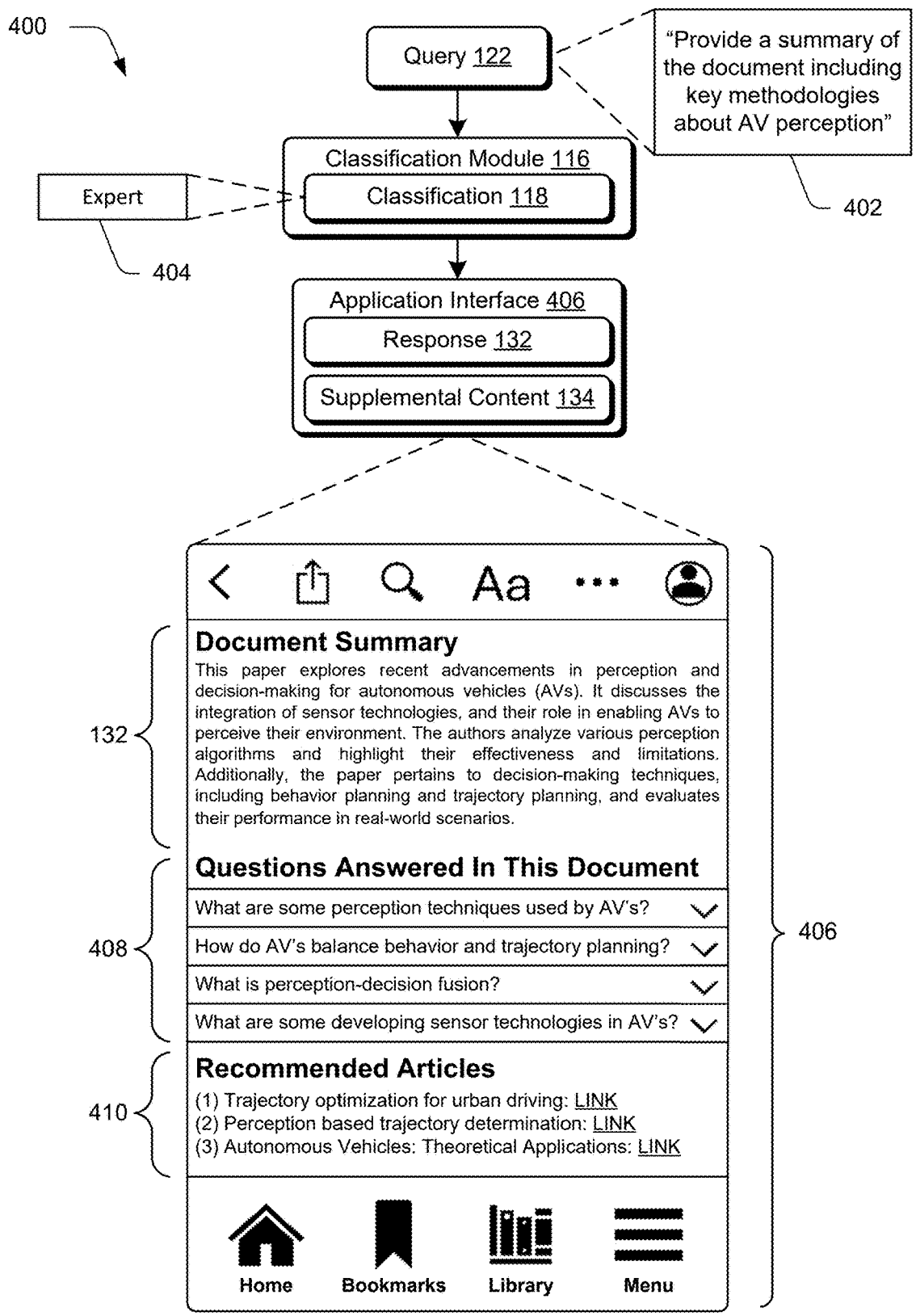
FIG. 4 depicts an additional example of query based classification in which an output is generated based on a query.

FIG. 4 depicts an additional example 400 of query based classification in which an output is generated based on a query. In this example, the classification module 116 receives an input 120 that includes a query 122 to a digital assistant 124 of an application 126. As in the above example, the application 126 represents a document viewing application to display and interact with a digital document 130 such as a technical paper that pertains to autonomous vehicles.

The query 122 includes a request to summary the digital document 130, e.g., the query 122 includes text 402 "Provide a summary of the document including key methodologies about AV perception."

Based on the query 122, the classification module 116 generates a classification 118 of a user associated with the query 122. For instance, the classification module 116 leverages the embedding model 208 and the classifier 210 to generate the classification 118 based on semantic properties of the query 122. For example, the query 122 includes semantic properties that indicate an understanding of autonomous vehicles, such as use of domain specific abbreviations and a directed query. The classification 118 indicates that the user associated with the query 122 has a proficiency with a topic of the document above a threshold level. Accordingly, the classifier 210 classifies the user as an "expert" as shown at 404.

Based on the classification 118, the classification module 116 configures an application interface 406. The application interface 406, for instance, includes a response 132 to the query 122 as well as supplemental content 134. To generate the response 132, the classification module 116 generates a prompt for a machine learning model 128 associated with the digital assistant 124 based on the classification 118 and the query 122. For instance, the prompt specifies to generate a summary and to tailor the summary for an expert in autonomous vehicles.

Accordingly, the classification module 116 generates the response 132 that includes technical language, expanded analysis, and specific details about the contents of the digital document 130. The classification module 116 further generates supplemental content 134, such as a questions answered section 408 and recommended articles 410. The section 408, for instance, includes selectable indicia to explain technical concepts included in the digital document 130 tailored for an expert. The recommended articles 410 include suggestions for additional digital content for a user associated with the query 122. In this way, the techniques described herein generate a content-specific customized user experience while conserving computational resources relative to conventional approaches that are reliant on large amounts of user data to model user behavior.

Figure 5:
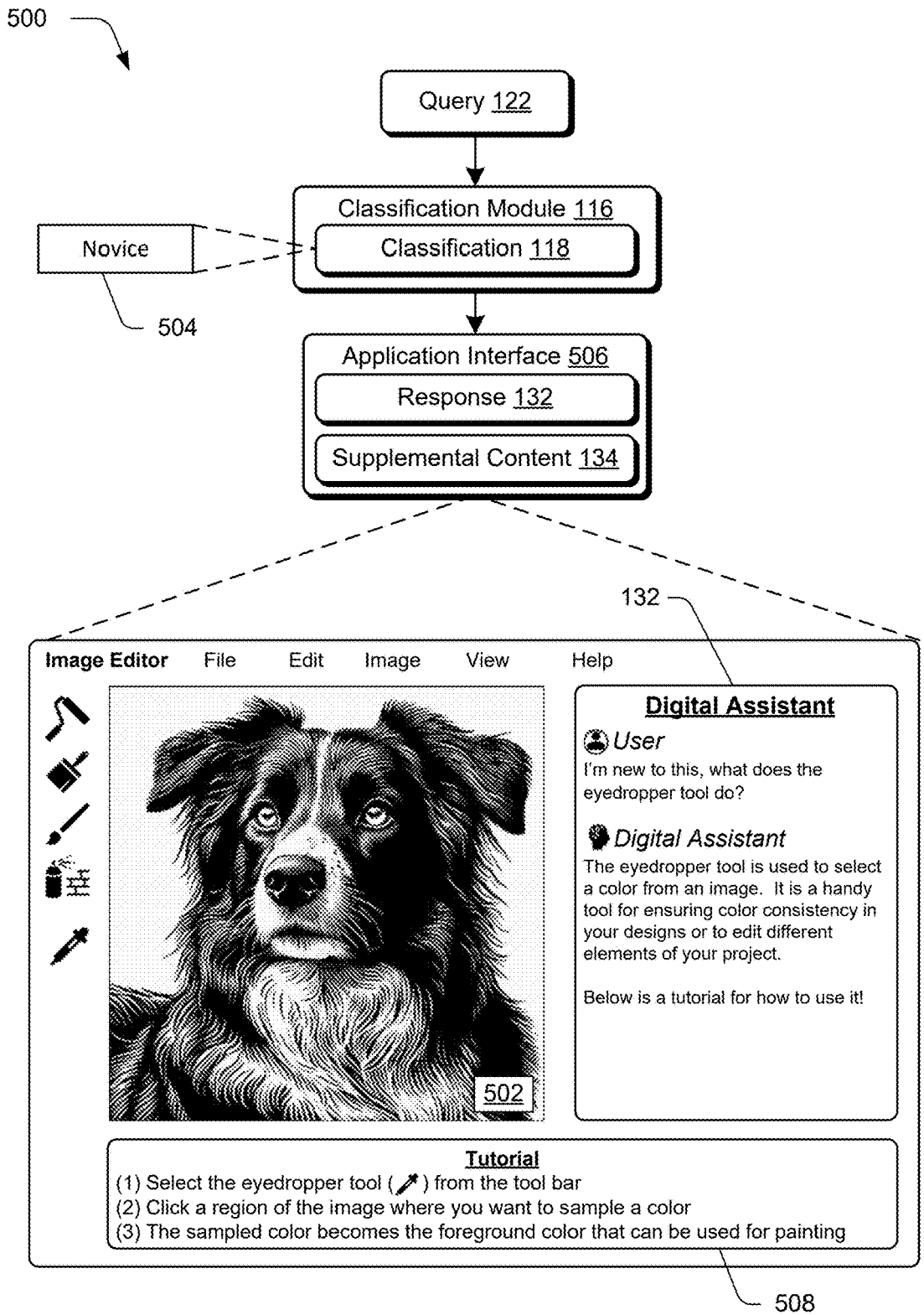
FIG. 5 depicts an example of query based classification to customize an interface based on a query.

FIG. 5 depicts an example 500 of query based classification to customize an interface based on a query. In this example, a digital assistant 124 of an application 126 receives an input 120 that includes a query 122 to a digital assistant 124 of an application 126. The application 126 represents a digital content editing application, such as to adjust a visual appearance of an image 502. The query 122 includes a question about a tool of the application 126, e.g., "I'm new to this, what does the eyedropper tool do."

In accordance with the techniques described herein, the classification module 116 generates a classification 118 of a user associated with the query 122. For instance, the classification module 116 leverages the embedding model 208 and the classifier 210 to generate the classification 118 based on semantic properties of the query 122. In this example, the query 122 includes semantic properties that indicate a lack of understanding of the eyedropper tool. Accordingly, the classifier 210 classifies the user as a "novice" with respect to the topic of the query 122 as shown at 504.

Based on the classification 118, the classification module 116 configures an application interface 506. The application interface 506, for instance, includes a response 132 to the query 122 as well as supplemental content 134. To generate the response 132, the classification module 116 generates a prompt for a machine learning model 128 associated with the digital assistant 124 based on the classification 118 and the query 122. For instance, the prompt specifies to generate an explanation of eyedropper tool and to tailor the summary for a novice with respect to the application 126 and the particular tool, e.g., the eyedropper tool. Accordingly, the classification module 116 generates the response 132 that includes simple language and a general overview of the eyedropper tool. The classification module 116 further generates supplemental content 134, such as a tutorial 508. In some examples, the prompt specifies to generate the supplemental content 134. The tutorial 508, for instance, includes guidance tailored for a novice for how to use the eyedropper tool.

Figure 6:
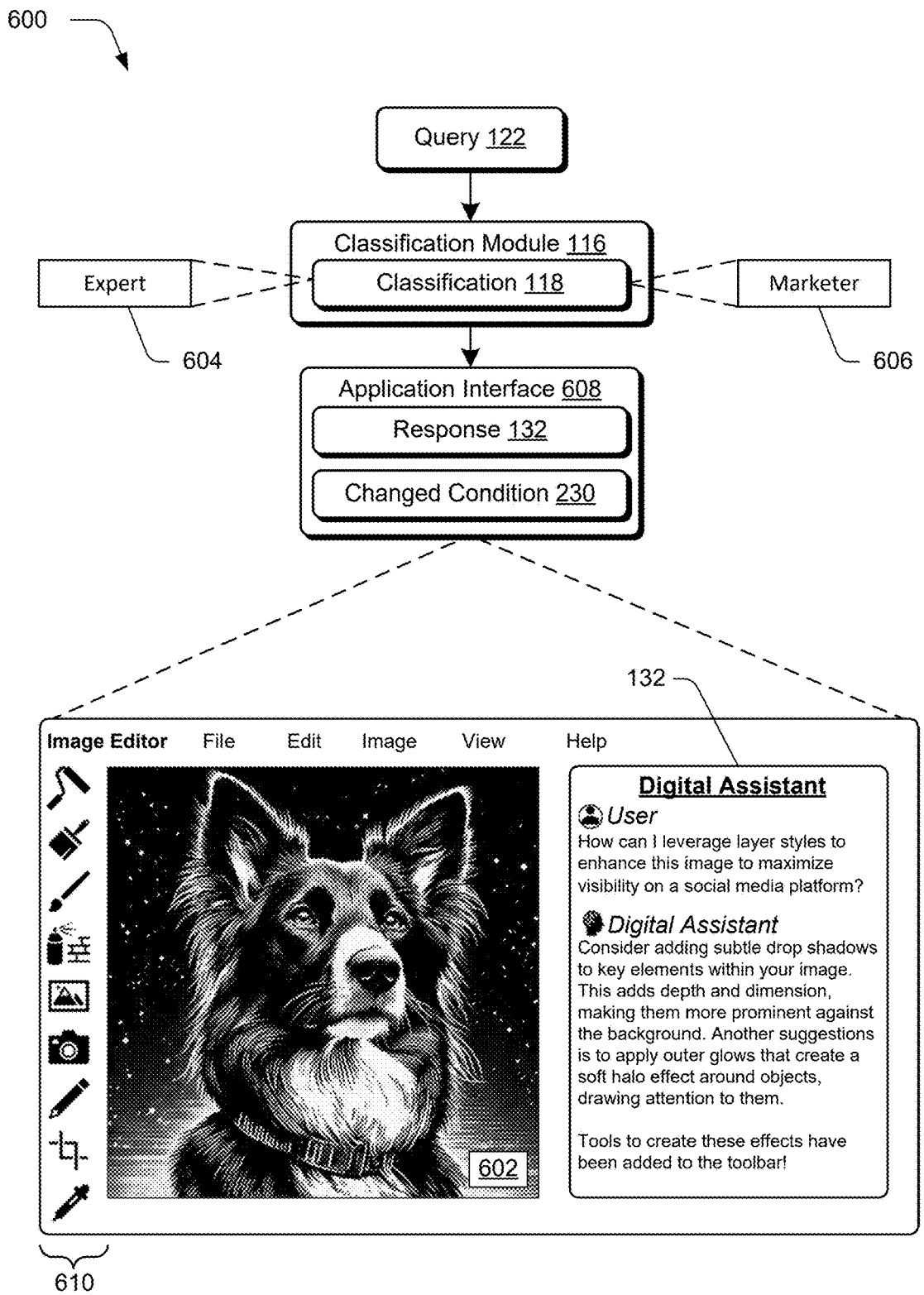
FIG. 6 depicts an additional example of query based classification to customize an interface based on a query.

FIG. 6 depicts an additional example 600 of query based classification to customize an interface based on a query. In this example, a digital assistant 124 of an application 126 receives an input 120 that includes a query 122 to a digital assistant 124 of an application 126. The application 126 represents a digital content editing application, such as to adjust a visual appearance of an image 602. The query 122 includes a question such as "How can I leverage layer styles to enhance this image to maximize visibility on a social media platform?"

In accordance with the techniques described herein, the classification module 116 generates a classification 118 of a user associated with the query 122. For instance, the classification module 116 leverages the embedding model 208 and the classifier 210 to generate the classification 118 based on semantic properties of the query 122. In this example, the query 122 includes semantic properties that indicate an understanding with the application, e.g., the query 122 includes domain specific information such as reference to "layer styles." Accordingly, the classification module 116 generates a first classification 604 that indicates that a user associated with the query 122 is above a threshold level of proficiency with a topic of the query 122.

The classification module 116 further determines that the query 122 indicates a profession based on an auxiliary component 204 of the query 122, e.g., "to maximize visibility on a social media platform." Accordingly, the classification module 116 generates a second classification 606 that indicates that the user associated with the query 122 is a marketer.

Based on the first classification 604 and the second classification 606, the classification module 116 configures an application interface 608. The application interface 608, for instance, includes a response 132 to the query 122 as well as a changed condition 230. To generate the response 132, the classification module 116 generates a prompt for a machine learning model 128 associated with the digital assistant 124 based on the first classification 604, the second classification 606, and the query 122. For instance, the prompt specifies to generate an answer to the query 122 and to tailor the answer for an expert with respect to the topic who is also a marketer. Accordingly, the classification module 116 generates the response 132 that includes technical details and in depth suggestions for changes to make to the image 602 that would help enhance visibility in a marketing context.

The classification module 116 further implements a changed condition 230 to the application interface 608, such as to surface one or more additional tools. In some examples, the prompt specifies to implement the changed condition 230. The surfaced tools 610, for instance, represent advanced functionality to achieve the suggestions included in the response 132. Accordingly, the techniques described support a variety of functionality based on multiple user classifications 118 while protecting user privacy during generation of content specific insights, which is not possible using conventional techniques.

Figure 7:
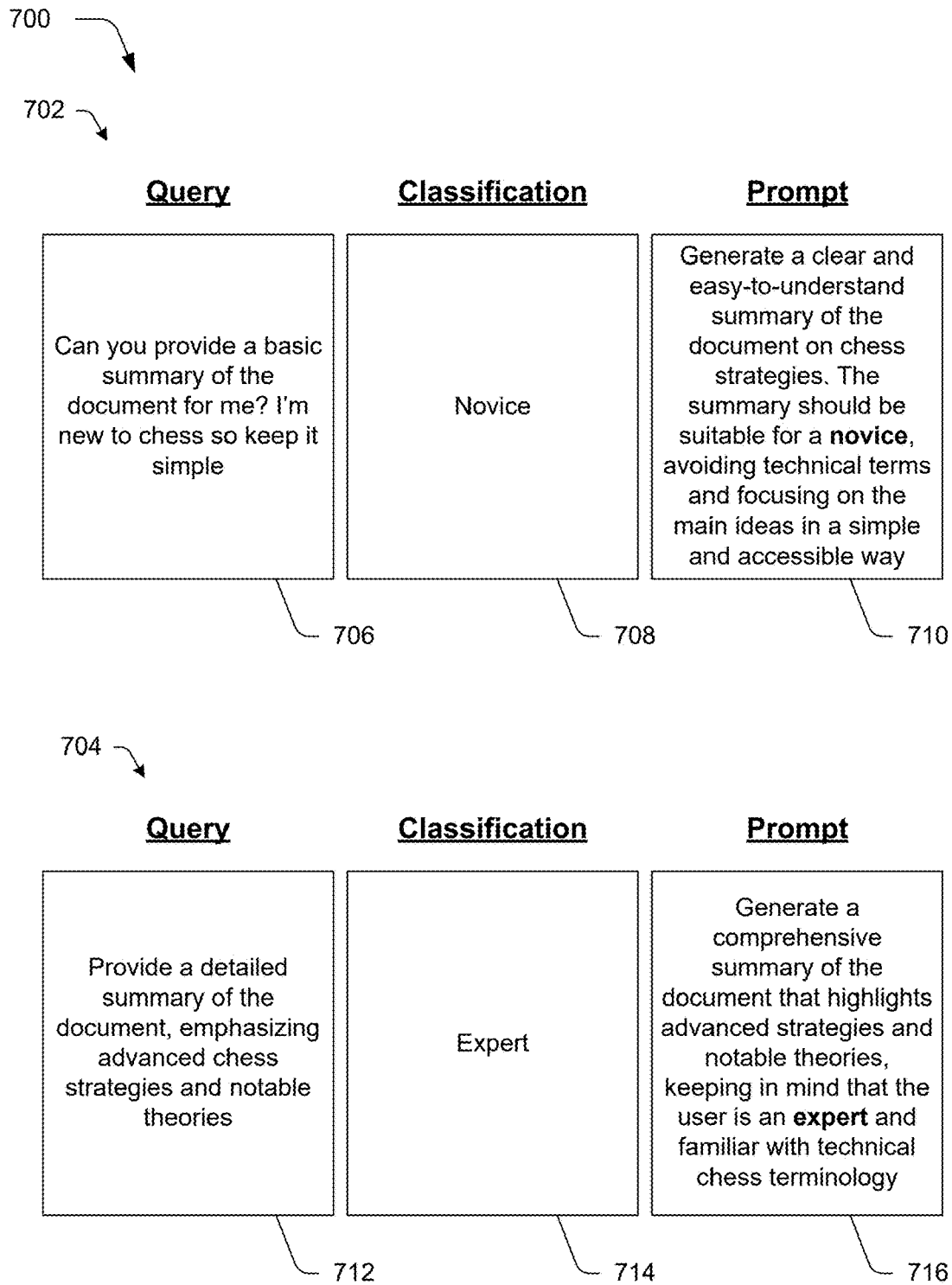
FIG. 7 depicts an example of query based classification to generate prompts based on a query and a classification.

FIG. 7 depicts an example 700 of query based classification to generate prompts based on a query and a classification in a first example 702 and a second example 704. As depicted in the first example 702, the classification module 116 receives a query 122 for processing by a machine learning model 128 that includes text 706 "Can you provide a basic summary of the document for me? I'm new to chess so keep it simple." While not depicted, in this example the query 122 is received via a digital assistant 124 of a document viewing application. The document viewing application, for instance, displays a digital document about chess. Thus, the query 122 represents a user input to the digital assistant 124, such as to request a summary of the document about chess.

In accordance with the techniques described herein, the classification module 116 generates a classification 118 of a user associated with the query 122, e.g., based on semantic properties of the query 122 such as keywords that indicate the user is unfamiliar with the domain. As shown at 708, the classification 118 indicates the user is a novice with respect to a topic of the query 122 and the document, e.g., chess. The classification module 116 then generates a prompt 710 for processing by the machine learning model 128 based on the query 122 and the classification 118.

The prompt 710, for instance, is a structured input that is configured to guide the machine learning model 128. In an example, the prompt represents an input provided "under the hood" to the machine learning model, such that the prompt is not visible to a user. In various examples, the prompt 710 includes, refines, edits, removes content from, and/or supplements content included in the query 122, such as to provide a suitable input for the machine learning model 128. The prompt 710 further includes the classification 118, such as to guide the machine learning model 128 to perform a task tailored for the classification 118.

In the illustrated example the prompt 710 includes the text "Generate a clear and easy-to-understand summary of the document on chess strategies. The summary should be suitable for a novice, avoiding technical terms and focusing on the main ideas in a simple and accessible way." Accordingly, the prompt 710 is generated to include aspects of the query 122, e.g., "generate a clear and easy-to-understand summary of the document . . . ."

In this example, the classification module 116 modifies text included in the query 122 to generate the prompt 710, such as to modify the adjective "basic" in the query 122 to "clear and easy-to-understand" in the prompt 710. In this way, the classification module 116 optimizes the prompt 710 to provide clarity and to efficiently guide the machine learning model 128. The prompt 710 further includes the classification 118, e.g., "The summary should be suitable for a novice . . . ." The machine learning model 128 is then able to process the prompt 710 to generate a response tailored to the classification 118.

As shown in the second example 704, the classification module 116 receives a query 122 for processing by a machine learning model 128 that includes text 712 "Provide a detailed summary of the document, emphasizing advanced chess strategies and notable theories." As in the first example 702, in the second example 704 the query 122 is received via a digital assistant 124 of a document viewing application that displays a document about chess.

In accordance with the techniques described herein, the classification module 116 generates a classification 118 of a user associated with the query 122, e.g., based on semantic properties of the query 122 such as domain specific keywords. As shown at 714, the classification 118 indicates the user is an expert with respect to a topic of the query 122 and the document, e.g., chess. The classification module 116 then generates a prompt 716 for processing by the machine learning model 128 based on the query 122 and the classification 118.

In the illustrated example the prompt 716 includes the text "Generate a comprehensive summary of the document that highlights advanced strategies and notable theories, keeping in mind that the user is an expert and familiar with technical chess terminology." Accordingly, the prompt 710 is generated to include aspects of the query 122, e.g., "generate a comprehensive summary of the document that highlights advanced strategies and notable theories" as well as the classification 118, e.g., "keeping in mind that the user is an expert and familiar with technical chess terminology." The machine learning model 128 is then able to process the prompt 716 to generate a response. In this way, the techniques described herein generate prompts based on user queries and classifications to support a variety of functionality.

Figure 8:
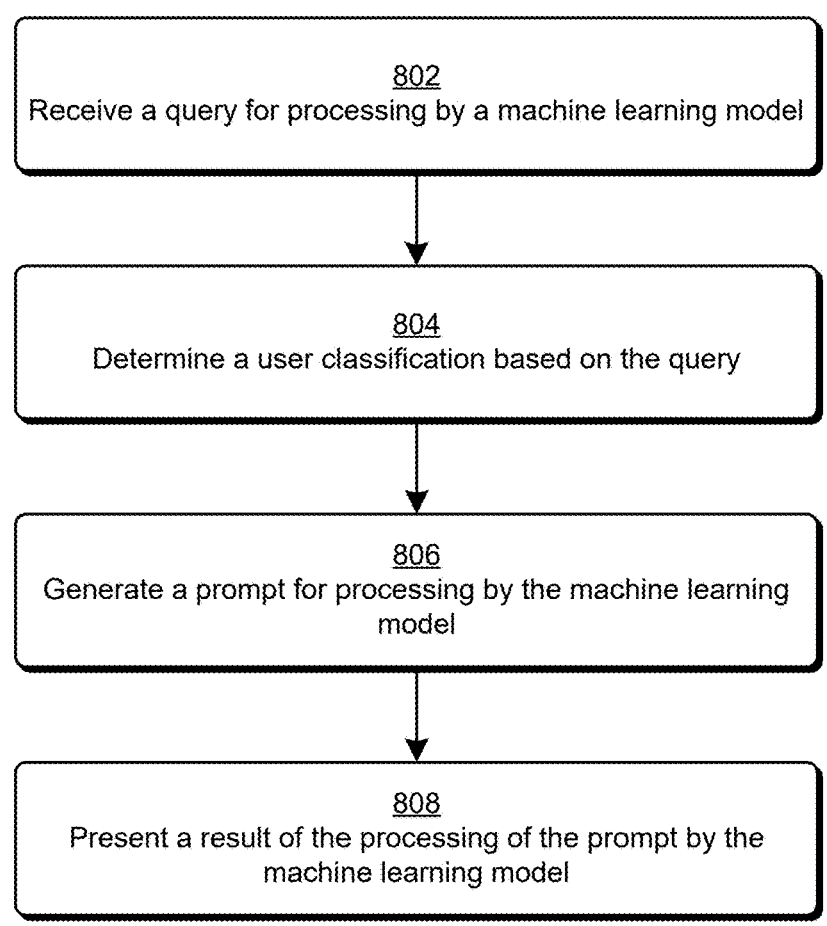
FIG. 8 is a flow diagram depicting an algorithm as a step-by-step procedure in an example implementation that is performable by a processing device to present a result of processing of a prompt by a machine learning model.

FIG. 8 is a flow diagram depicting an algorithm as a step-by-step procedure 800 in an example implementation that is performable by a processing device to present a result of processing of a prompt by a machine learning model.

To being in this example, a query for processing for by a machine learning model is received (block 802). The query 122, for instance, represents an input to an artificial intelligence based digital assistant, e.g., a digital assistant 124 within a user interface 110.

A user classification is then determined based on the query (block 804). The classification 118, for instance, indicates one or more user characteristics based on semantic properties of the query 122. In an example, the user characteristics categorize a user associated with the query 122 into a group based on semantic properties of the query 122. In at least one example, the classification 118 indicates a degree of proficiency with a topic of the query 122.

A prompt for processing by the machine learning model is generated (block 806). The prompt is based on and/or includes the query 122 and/or the classification 118. The prompt, for instance, is a structured input provided to guide the machine learning model 128 to perform various tasks and/or functionality.

A result of the processing of the prompt by the machine learning model is then presented (block 808). The machine learning model 128, for instance, receives the prompt as input and generates a result specified by the prompt. The result, for instance, includes one or more of a response to the query (e.g., a response tailored to the user classification), a changed condition 230 of an application user interface 110, or supplemental content 134, e.g., that is generated by the classification module 116 based on the classification 118 such as described in more detail in the following examples. In various examples, the classification module 116 causes the result to be presented, such as output in a user interface 110 of a display device 112.

Figure 9:
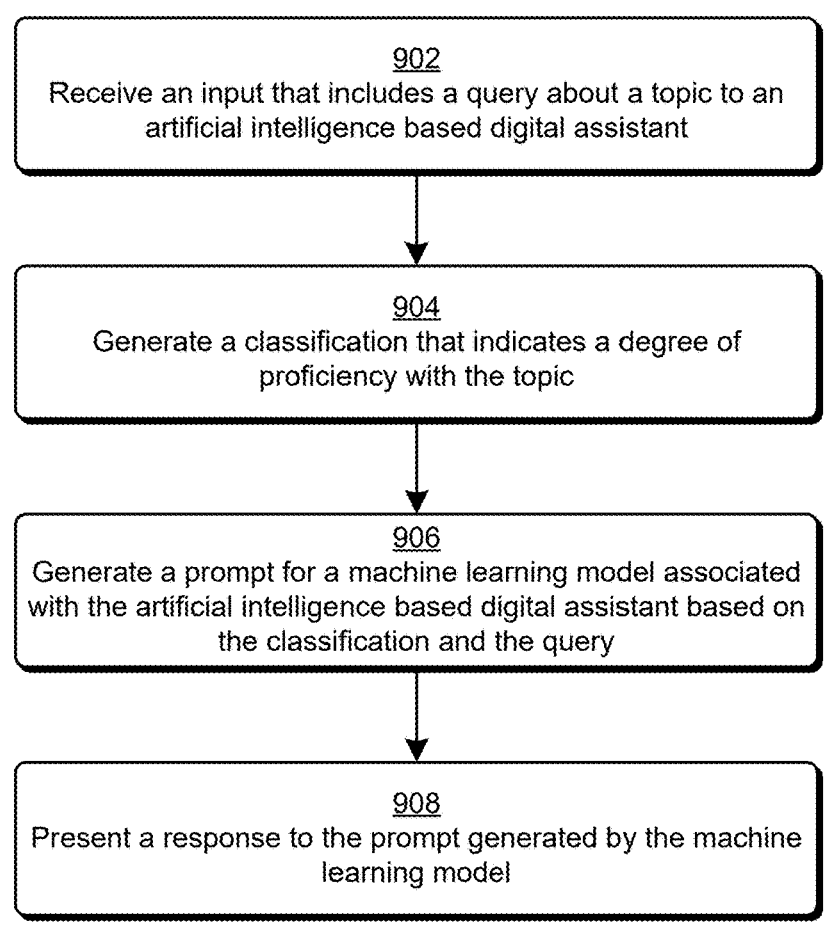
FIG. 9 is a flow diagram depicting an algorithm as a step-by-step procedure in an example implementation that is performable by a processing device to tune a prompt to a machine learning model based on a classification.

FIG. 9 is a flow diagram depicting an algorithm as a step-by-step procedure 900 in an example implementation that is performable by a processing device to tune a prompt to a machine learning model based on a classification.

To begin in this example, an input is received that includes a query about a topic to an artificial intelligence based digital assistant (block 902). The query 122 represents a question and/or command provided to the digital assistant 124. The query 122, for instance, is a natural language request for information, task execution, search functionality, personalization, etc. to be performed by a machine learning model 128 associated with the digital assistant 124. In some examples, the query 122 includes a primary component 202 that represents a main directive and/or purpose of the query 122, and an auxiliary component 204 that includes auxiliary information that provides additional information to clarify, refine, constrain, and/or supplement the primary component 202.

A classification is generated that indicates a degree of proficiency with the topic (block 904). The classification 118, for instance, is a binary classification based on semantic properties of the query 122 that indicates whether a user associated with the query 122 is proficient with the topic. In an example, the classification module 116 determines that the degree of proficiency is below a threshold and accordingly generates the classification to indicate that the user is not proficient with respect to the topic, e.g., the user is classified as a "novice." Alternatively or additionally, the classification module 116 determines that the degree of proficiency is above a threshold and accordingly generates the classification to indicate that the user is proficient with respect to the topic, e.g., the user is classified as an "expert."

A prompt is then generated for a machine learning model associated with the artificial intelligence based digital assistant based on the classification and the query (block 906). The prompt, for instance, is a structured input based on the query 122 to guide the machine learning model 128. In an example, the classification module 116 generates one or more input specifications to tune the prompt based on the primary component 202 and/or the auxiliary component 204 of the query 122. The input specifications, for instance, guide and/or constrain the prompt to influence the generated output by the machine learning model 128.

A response to the prompt generated by the machine learning model is then presented (block 908). For instance, the machine learning model 128 receives the prompt as input and generates a response that includes an answer to a question and/or execution of a task specified by the query 122. The classification module 116, for instance, causes the response 132 to be output, such as in a user interface 110 of a display device 112.

Figure 10:
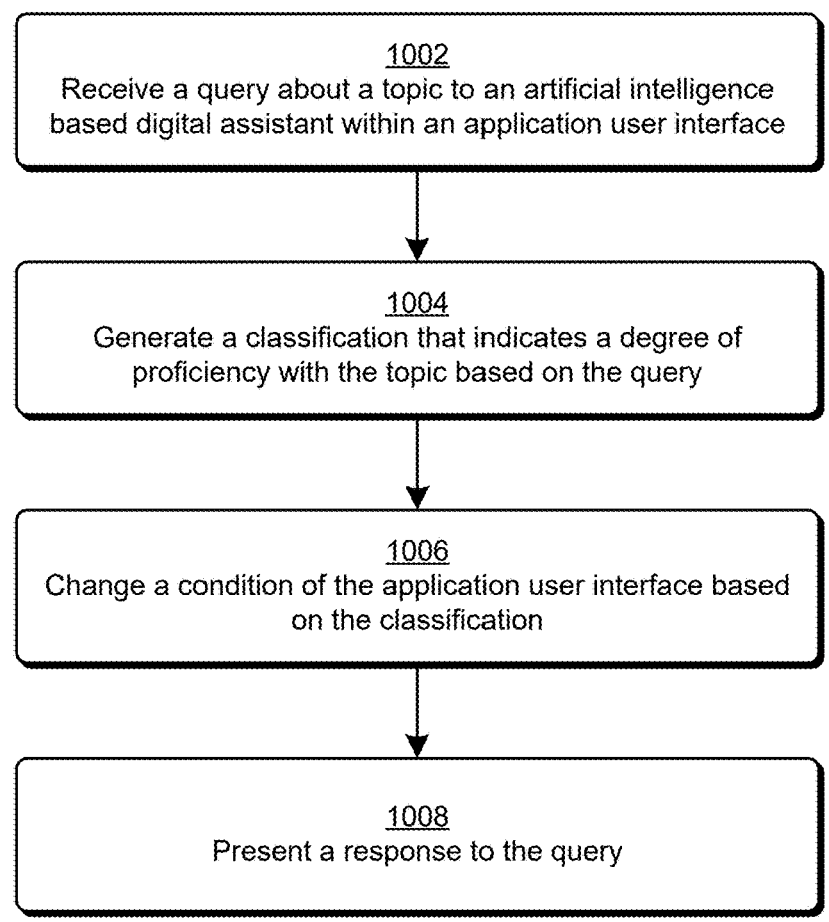
FIG. 10 is a flow diagram depicting an algorithm as a step-by-step procedure in an example implementation that is performable by a processing device to change a condition of a user interface based on a query.

FIG. 10 is a flow diagram depicting an algorithm as a step-by-step procedure 1000 in an example implementation that is performable by a processing device to change a condition of a user interface based on a query.

To begin in this example, a query is received about a topic to an artificial intelligence based digital assistant within an application user interface (block 1002). Generally, the topic pertains to a subject, field, and/or category of the query 122. In one example, the query 122 pertains to one or more aspects of an application 126, such as how to perform various functionalities using the application 126. In an additional or alternative example, the topic relates to an instance of digital content 106.

A classification is then generated that indicates a degree of proficiency with the topic based on the query (block 1004). To generate the classification, for instance, the classification module 116 leverages a classifier 210 (e.g., a trained support vector machine) that is trained to generate classifications based on semantic properties of input queries. The semantic properties, for instance, includes one or more of a language style of the query 122, presence of keywords or text strings in the query 122, sentiment analysis information, task classification information, length of the query 122, etc.

In some examples, the classification 118 is further based on a behavioral metric 218. The behavioral metric 218 is a quantifiable measure that represents one or more aspects of an interaction, e.g., a user interaction, to generate the query 122. In various examples, the behavioral metric 218 includes a number of queries generated as part of the interaction, a frequency of queries generated as part of the interaction, and or a similarity between multiple queries 122 included as part of the interaction.

Alternatively or additionally, in some examples the classification 118 is further based on metadata 222 that includes information about a structure and/or various attributes of the digital content 106. The metadata 222, for instance, includes one or more of a page count, a file size, a file format, a document structure, a file source, etc. In some examples, the classification module 116 determines a relationship between two or more instances of metadata 222, such as a file size to page count ratio, as part of generation of the classification 118.

Based on the classification, a condition of the application user interface is changed (block 1006). For instance, the classification module 116 is configured to modify one or more aspects of the user interface 110 that displays the application 126, such as a visual appearance of the user interface 110, content displayed by the user interface 110, personalized features of the user interface 110, etc. For example, the classification module 116 generates a changed condition 230 that includes surfacing and/or removing one or more tools, icons, menus, selectable indicia, feedback elements, etc. from the user interface 110 of an application 126. Alternatively or additionally, the changed condition 230 includes one or more changed device properties, such as one or more display settings of the display device 112 that displays the user interface 110.

In one or more examples, the classification 118 indicates that the degree of proficiency with the topic is below a threshold (e.g., a user is a novice) and the changed condition 230 includes implementation of an instructional version of the application user interface 110. In an additional or alternative example, the classification 118 indicates that the degree of proficiency with the topic is above a threshold, e.g., a user is an expert with respect to the topic. Accordingly, the changed condition 230 includes displaying an advanced setting, feature, tool, and/or selectable indicia within the application user interface 110.

In various examples, a response to the query is then presented (block 1008). The response 132, for instance, includes relevant information, suggestions, and/or actions based on the query 122. In some implementations, the response module 232 leverages a machine learning model 128 (e.g., an LLM configured to comprehend, analyze, and/or generate human-like text) to generate the response 132.

Figure 11:
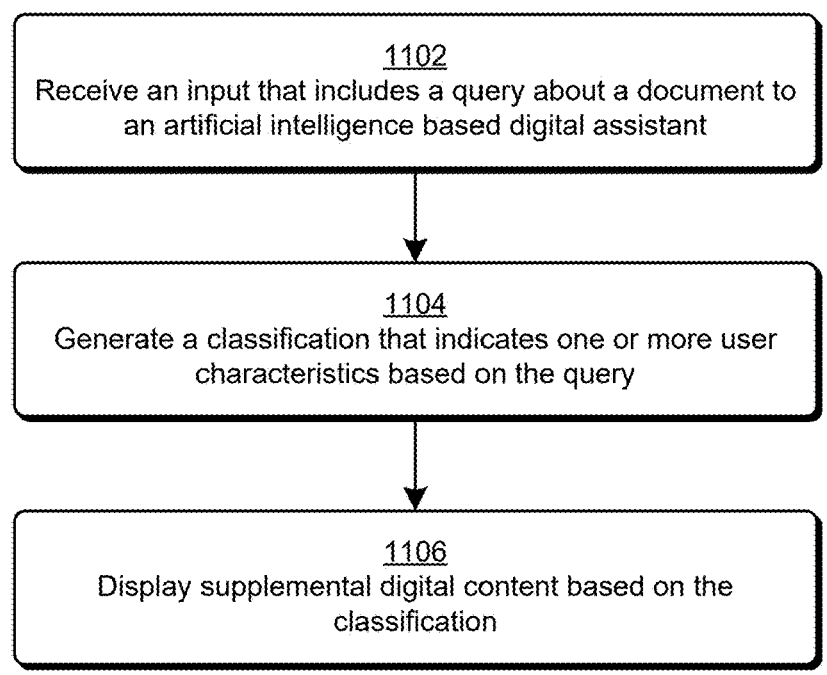
FIG. 11 is a flow diagram depicting an algorithm as a step-by-step procedure in an example implementation that is performable by a processing device to generate supplemental digital content based on a classification.

FIG. 11 is a flow diagram depicting an algorithm as a step-by-step procedure 1100 in an example implementation that is performable by a processing device to generate supplemental digital content based on a classification.

In this example, an input is received that includes a query about a document to an artificial intelligence based digital assistant (block 1102). For instance, the query includes a natural language request for information about content and/or structure of a digital document 130, navigation of the digital document 130, insights and/or suggestions about the digital document 130, etc. In an example, the query 122 includes a request to generate a summary of the digital document 130.

A classification is generated that indicates one or more user characteristics based on the query (block 1104). The characteristics, for instance, categorize one or more users into discrete groups based on semantic properties of the query 122. In some examples, the characteristics indicate one or more of a proficiency level with a particular topic (e.g., novice, intermediate, expert, etc.), a profession (e.g., marketing, research, engineering, finance, etc.), a role (e.g., customer, employee, developer, administrator, supervisor, etc.), an industry (e.g., healthcare, legal, education, technology, etc.), an age group, an education level, user motivations, etc.

Supplemental digital content based on the classification is then displayed (block 1106). The supplemental content 134, for instance, includes a variety of digital content (e.g., digital images, digital videos, text, audio content, instructional content, etc.) generated based on the classification 118. For example, the classification 118 indicates that the degree of proficiency with the topic is below a threshold (e.g., a user is a novice) and the supplemental content 134 includes visual media to explain the topic to the user. In an additional or alternative example, the classification 118 indicates that the degree of proficiency with the topic is above a threshold (e.g., the user is an expert) and the supplemental content 134 includes digital content (e.g., a graph, visual aid, infographic) that expounds on the topic. Alternatively or additionally, the supplemental content 134 includes recommendations for additional digital documents related to the topic to provide additional insights.

Example System and Device

Figure 12:
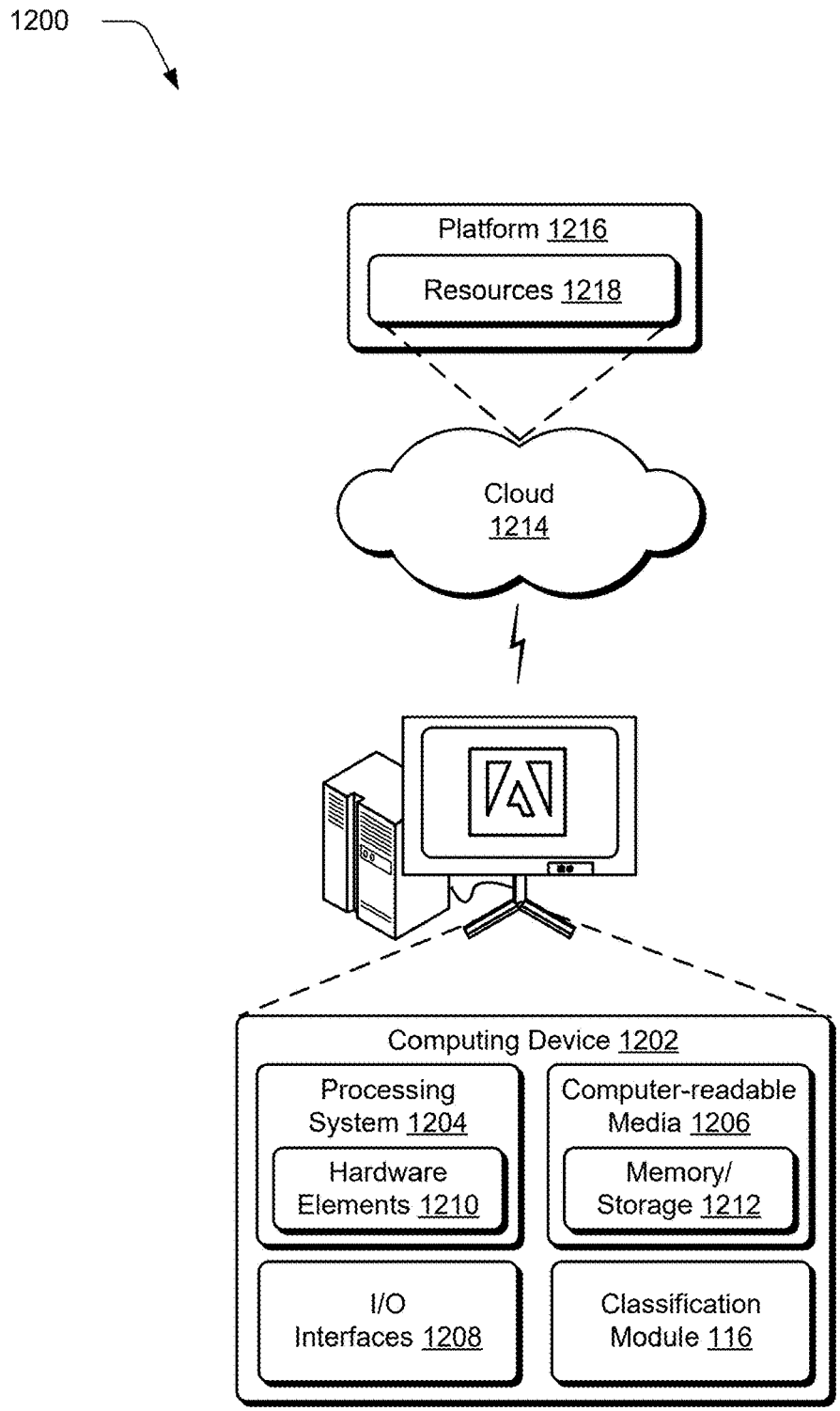
FIG. 12 illustrates an example system including various components of an example device that can be implemented as any type of computing device as described and/or utilized with reference to FIGS. 1-11 to implement embodiments of the techniques described herein.

FIG. 12 illustrates an example system generally at 1200 that includes an example computing device 1202 that is representative of one or more computing systems and/or devices that implement the various techniques described herein. This is illustrated through inclusion of the classification module 116. The computing device 1202 is configurable, for example, as a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1206 is illustrated as including memory/storage 1212. The memory/storage 1212 represents memory/storage capacity associated with one or more computer-readable media. The memory/storage 1212 includes volatile media (such as random access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supported by various configurations of the computing device 1202 and are not limited to the specific examples of the techniques described herein. This functionality is also implementable all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving, by a processing device, a query to an artificial intelligence based digital assistant within an application user interface;
   generating, by the processing device, a user classification that indicates a degree of proficiency with a topic of the query based on semantic properties of the query;
   processing, by a machine learning model associated with the artificial intelligence based digital assistant, a prompt that includes the query and the user classification; and
   presenting, in the application user interface of the processing device, a result of the processing of the prompt by the machine learning model that includes adding or removing a digital tool to or from the application user interface based on whether the degree of proficiency is above or below a threshold value.

2. The method as described in claim 1, wherein the generating the user classification includes:
   generating, by the processing device, an embedding of the query using a sentence embedding model; and
   determining the user classification by inputting the embedding as a feature vector to a classifier model trained to generate classifications based on semantic properties of queries.

3. The method as described in claim 1, further comprising extracting auxiliary information from the query that defines a semantic context for the query, and wherein the user classification is generated based on the auxiliary information.

4. The method as described in claim 3, wherein the auxiliary information includes one or more of a language style of the query, presence of key text strings in the query, sentiment analysis information, or task classification information.

5. The method as described in claim 1, wherein the result further includes one or more of a response to the query tailored to the user classification, a changed condition of the application user interface of the processing device, or supplemental digital content generated based on the user classification.

6. The method as described in claim 1, wherein the user classification is further based on a behavioral metric associated with a user interaction to generate the query, the behavioral metric including one or more of a number of queries generated as part of the user interaction, a frequency of queries generated as part of the user interaction, or a similarity metric between two or more queries generated as part of the user interaction.

7. The method as described in claim 1, wherein the user classification indicates the degree of proficiency with the topic is less than the threshold value, and generating the prompt includes tuning the prompt with an input specification to generate a response to the query for a novice in the topic.

8. The method as described in claim 1, wherein the user classification indicates the degree of proficiency with the topic is greater than the threshold value, and generating the prompt includes tuning the prompt with an input specification to generate a response to the query for an expert in the topic.

9. A system comprising:
a memory component; and
a processing device coupled to the memory component, the processing device to perform operations including:
receiving a query that pertains to digital content displayed in an application user interface of the processing device;
determining a user classification that indicates a degree of proficiency with a topic of the query;
processing a prompt by a machine learning model associated with the application user interface, the prompt generated based on the user classification and the query; and
presenting a result of the processing of the prompt by the machine learning model that includes adding or removing a digital tool to or from the application user interface based on whether the degree of proficiency is above or below a threshold value.

10. The system as described in claim 9, wherein the user classification is based on semantic properties of the query, the semantic properties including one or more of a language style of the query, presence of key text strings in the query, sentiment analysis information, or task classification information.

11. The system as described in claim 9, wherein the query represents an input to an artificial intelligence based digital assistant within the application user interface, and the result includes changing one or more display settings of the processing device based on the user classification.

12. The system as described in claim 9, wherein the degree of proficiency with the topic of the query is below the threshold value, and the result includes removing the digital tool from the application user interface to display a simplified view of the application user interface.

13. The system as described in claim 9, wherein the degree of proficiency with the topic of the query is above the threshold value, and the result includes adding the digital tool within the application user interface that supports functionality of the application user interface that corresponds to the degree of proficiency.

14. A non-transitory computer-readable storage medium storing executable instructions, which when executed by a processing device, cause the processing device to perform operations comprising:
generating a user classification based on semantic properties of a query received in an application user interface of the processing device that indicates a degree of proficiency with a topic of the query;
processing a prompt by a machine learning model associated with the application user interface, the prompt generated based on the query and the user classification; and
presenting a result of the processing of the prompt by the machine learning model in the application user interface that includes adding or removing a digital tool to or from the application user interface based on whether the degree of proficiency is above or below a threshold.

15. The non-transitory computer-readable storage medium as described in claim 14, wherein the semantic properties including one or more of a language style of the query, presence of key text strings in the query, sentiment analysis information, or task classification information.

16. The non-transitory computer-readable storage medium as described in claim 14, wherein the query represents an input to an artificial intelligence based digital assistant within the application user interface, and the result further includes displaying supplemental digital content generated based on the user classification within the application user interface.

17. The non-transitory computer-readable storage medium as described in claim 16, wherein the user classification indicates that the degree of proficiency with the topic of the query is below the threshold, and the supplemental digital content includes visual media to further explain the topic.

18. The non-transitory computer-readable storage medium as described in claim 14, wherein the user classification is further based on a detected user interaction with digital content displayed by the application user interface that includes one or more of a reading speed, a time per page metric, or a scrolling behavior.

19. The non-transitory computer-readable storage medium as described in claim 14, wherein the user classification is further based on administrative metadata associated with digital content displayed by the application user interface that includes information about a structure of the digital content, the administrative metadata subject to a privacy procedure implemented by the processing device to conceal content information of the digital content.

20. The method as described in claim 1, wherein the digital tool includes one or more of an icon, menu, selectable indicia, or feedback element.

* * * * *